March 22, 1949.  R. J. NEBESAR  2,465,257
LAMINATED TUBULAR ARTICLE
Filed Sept. 12, 1945

WITNESS:
Peter R. Mitchell

INVENTOR.
Robert J. Nebesar
BY Busser and Harding
ATTORNEYS.

Patented Mar. 22, 1949

2,465,257

UNITED STATES PATENT OFFICE 2,465,257

LAMINATED TUBULAR ARTICLE

Robert J. Nebesar, Bristol, Va., assignor to Universal Moulded Products Corporation, Bristol, Va., a corporation of Delaware Application September 12, 1945, Serial No. 615,812

2 Claims. (Cl. 138—78)

In laminated articles, made of wood, paper and other material, adjacent laminae are united by a suitable adhesive, such as any of the well known resin or plastic compounds, the adhesive also impregnating, wholly or to some depth, the material of the sheets. A tube or cylinder is one example of such a laminated article. Such tubes or cylinders are usually made of paper but may be made of other material. Many tubular structures, in order to meet practical requirements, do not have adequate resiliency against shock, due to brittleness and consequent lack of flexibility.

The object of the invention is to provide a laminated tube having maximum flexibility and minimum brittleness so as to give the tube great resiliency against shock. A tube embodying the invention possesses these qualities and has certain added advantages, such as reduced weight, permissibly reduced wall thickness, and decrease in cost of manufacture.

A preferred embodiment of the invention is shown in the accompanying drawings, in which.

The tubes of the figures will be described as comprising sheets of paper, to the use of which material the invention is especially applicable, although it will be understood that superposed sheets of any material that is susceptible of being rolled into a tubular form may be substituted for paper.

Before rolling into a tube the sheets are placed one upon another but all adjacent sheets are not united or impregnated by the adhesive. A plurality of sheets that constitutes each of the following layers—the outer layer $a$, the inner layer $b$ and a central layer $c$—are so united, preferably by an adhesive impregnating to high resin content. The other two layers, namely, the layer $d$ between the outer layer and the central layer and the layer $e$ between the inner layer and the central layer are not so united and impregnated. However, at the points $f$, $f$, where the individual layers are cut off to form the final tubular article, the sheets comprising the layers $d$ and $e$ are also so united and impregnated, so that the ends of the tubular article will have the resin content required to afford protection against penetration of moisture and delamination.

Figure 1:
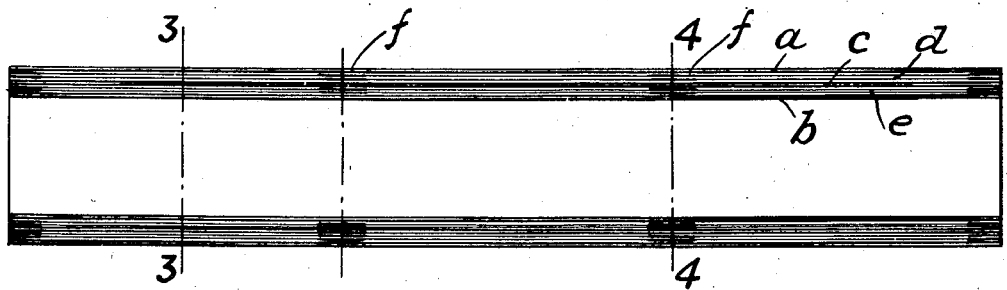
Fig. 1 is a longitudinal section view of a tube of any practicable length adapted to be cut into sections forming the individual tubes that constitute the final product.
Figure 2:
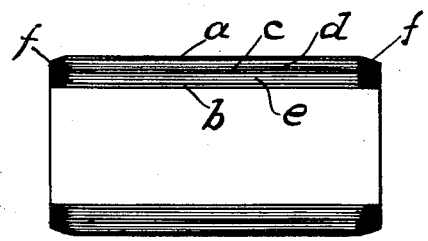
Fig. 2 is a similar view of one of the individual tubes or cylinders cut from the tubular structure of Fig. 1.
Figure 3:
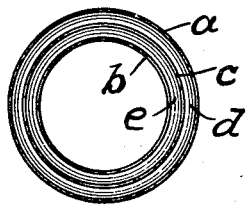
Fig. 3 is a cross-section on the line 3—3 of Fig. 1.
Figure 4:
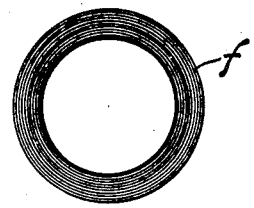
Fig. 4 is a cross-section on the line 4—4 of Fig. 1.
Figure 5:
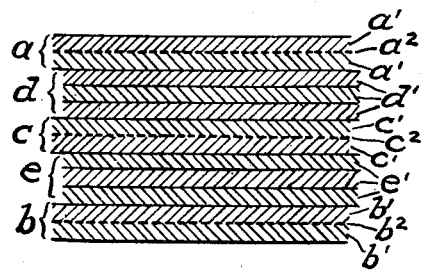
Fig. 5 is a longitudinal sectional (diagrammatic) view through the wall of a tube with the thicknesses of the paper laminae and of the adhesive films between the paper laminae greatly exaggerated.

In the greatly enlarged diagrammatic view shown in Fig. 5, the paper sheets of the layers $a$, $b$, $c$, $d$ and $e$ are lettered respectively $a'$, $b'$, $c'$, $d'$ and $e'$, while the films of resinous compound between the sheets of layers $a$, $b$ and $c$ are lettered respectively $a^2$, $b^2$ and $c^2$. It will be understood that the thickness of the films or resinous compound between adjacent sheets is nominal or negligible, adjacent sheets $a'$ or $b'$ or $c'$ being substantially in contact and united by a resinous compound that penetrates both sheets.

It is found that a tube or cylinder of the above described construction is substantially more flexible than if all adjacent laminae are adhesively united and impregnated and that the tube or cylinder is far more resistant to shock. Further, it is found that such tube so constructed permits a decrease in overall wall thickness without sacrifice of strength and with a still further increase in flexibility incident to reduced thickness. Reduction in wall thickness is of especial utility in the manufacture of various tubular articles, such as containers. Containers often have imposed upon them great dynamic loads, resistance to which is determined by drop testing. Containers embodying my invention successfully meet drop tests of especial severity.

A serious element of cost of production of laminated tubular articles is the cost of the resin. My improvement involves a reduction of from 30 to 50% of the quantity of resin required to impregnate the entire structure. Obviously, also, this feature effects corresponding reduction in the weight of the completed article.

What I claim and desire to protect by Letters Patent is:

1. A tube comprising a multiplicity of laminae of flexible sheets of material consisting of an outer layer, an inner layer, an approximately central layer, a layer between the central layer and the outer layer and a layer between the central layer and the inner layer, each layer comprising a plurality of sheets, adjacent sheets of each of the first three named layers being united by and impregnated with an adhesive from end to end thereof, adjacent sheets of the other two layers, throughout the greater portion of the length of the tube, being substantially free of said adhesive, whereby greater resistance to shock is provided by the increase of flexibility and the reduction of brittleness and weight, all the sheets at opposite ends of the tube being united and impregnated inward from their ends with said adhesive to protect against penetration of moisture and delamination longitudinally of the tubes between the sheets at the edges thereof.

2. A tubular structure comprising a multiplicity of laminae of flexible sheets and consisting of an outer layer, an inner layer, an approximately central layer, a layer between the central layer and the outer layer and a layer between the central layer and the inner layer, each layer comprising a plurality of sheets, adjacent sheets of each of the first three named layers being united by and impregnated with an adhesive from end to end thereof, adjacent sheets of the other two layers, throughout the greater portion of the length of the tube, being substantially free of said adhesive, whereby greater resistance to shock is provided by the increase of flexibility and the reduction of brittleness and weight, all adjacent sheets being united by and impregnated with said adhesive for relative short distances along the length of the tube at spaced apart intervals, so that the tube, at such intervals, may be cut into sections to form tubular sections having completely impregnated ends to protect against penetration of moisture and delamination longitudinally of the tubes between the sheets at the edges thereof.

ROBERT J. NEBESAR.

REFERENCES CITED

The following references are of record in the file of this patent:

UNITED STATES PATENTS

| Number | Name | Date |
|---|---|---|
| 1,284,295 | Frederick | Nov. 12, 1918 |
| 1,333,579 | Schumacher | Mar. 9, 1920 |
| 1,556,575 | Armstrong | Oct. 13, 1925 |
| 2,344,600 | Codwise | Mar. 21, 1944 |